US010938205B2

(12) United States Patent
Ohtsu et al.

(10) Patent No.: US 10,938,205 B2
(45) Date of Patent: Mar. 2, 2021

(54) ELECTRONIC DEVICE

(71) Applicants: Mitsubishi Electric Corporation, Tokyo (JP); Mitsubishi Electric Lighting Corporation, Kamakura (JP)

(72) Inventors: Teiji Ohtsu, Kanagawa (JP); Mamoru Kamikura, Tokyo (JP); Akira Yamagami, Kanagawa (JP); Shinsuke Funayama, Kanagawa (JP)

(73) Assignees: MITSUBISHI ELECTRIC CORPORATION, Tokyo (JP); MITSUBISHI ELECTRIC LIGHTING CORPORATION, Kamakura (JP)

( * ) Notice: Subject to any disclaimer, the term of this patent is extended or adjusted under 35 U.S.C. 154(b) by 0 days.

(21) Appl. No.: 16/334,182

(22) PCT Filed: Sep. 21, 2017

(86) PCT No.: PCT/JP2017/034125
§ 371 (c)(1),
(2) Date: Mar. 18, 2019

(87) PCT Pub. No.: WO2018/056364
PCT Pub. Date: Mar. 29, 2018

(65) Prior Publication Data
US 2020/0028358 A1 Jan. 23, 2020

(30) Foreign Application Priority Data
Sep. 26, 2016 (JP) .............................. JP2016-186880

(51) Int. Cl.
*H02H 9/06* (2006.01)
*H05B 45/37* (2020.01)
(Continued)

(52) U.S. Cl.
CPC ................ *H02H 9/06* (2013.01); *H02M 1/32* (2013.01); *H02M 7/062* (2013.01); *H05B 45/10* (2020.01); *H05B 45/37* (2020.01)

(58) Field of Classification Search
None
See application file for complete search history.

(56) References Cited

U.S. PATENT DOCUMENTS 5,101,180 A * 3/1992 Frey ..................... H02H 9/005
333/12
5,625,521 A * 4/1997 Luu ..................... H02H 9/042
361/111
(Continued)

FOREIGN PATENT DOCUMENTS

JP 63149152 U 9/1988
JP 05308721 A 11/1993
(Continued)

OTHER PUBLICATIONS

International Search Report (PCT/ISA/210) dated Oct. 31, 2017, by the Japan Patent Office as the International Searching Authority for International Application No. PCT/JP2017/034125.
(Continued)

*Primary Examiner* — Crystal L Hammond
(74) *Attorney, Agent, or Firm* — Buchanan Ingersoll & Rooney PC

(57) ABSTRACT

An electronic device according to the present invention includes a power supply unit and a load, the power supply unit including a ground terminal, a rectifier circuit, a circuit section connected to a DC output of the rectifier circuit, the circuit section supplying electric power to the load, a first varistor connected at one end thereof to one input end of the rectifier circuit, a second varistor connected at one end thereof to another input end of the rectifier circuit and connected at another end thereof to another end of the first (Continued)

varistor and an arrester connected at one end thereof to the another end of the second varistor and connected at another end thereof to the ground terminal, wherein an electrostatic capacity of each of the first and second varistors is 40% or more of a sum of earth capacitances of the power supply unit and the load.

16 Claims, 6 Drawing Sheets

(51) Int. Cl.
    *H05B 45/10*          (2020.01)
    *H02M 1/32*          (2007.01)
    *H02M 7/06*          (2006.01)

(56) References Cited

U.S. PATENT DOCUMENTS

| | | | | |
|---|---|---|---|---|
| 5,761,021 | A * | 6/1998 | Yu | H01R 13/6666 340/635 |
| 5,825,137 | A * | 10/1998 | Titus | H05B 41/295 315/291 |
| 6,657,841 | B1 * | 12/2003 | Melchert | H03K 17/08142 361/100 |
| 8,531,811 | B2 * | 9/2013 | Ruess | H02H 9/042 361/117 |
| 2007/0002512 | A1 * | 1/2007 | Schonenberger | G01R 19/16547 361/118 |
| 2008/0297129 | A1 * | 12/2008 | Nagasaki | G05F 1/63 323/298 |
| 2009/0033228 | A1 * | 2/2009 | Kobayashi | H01J 23/34 315/5 |
| 2012/0212143 | A1 * | 8/2012 | Esaki | H05B 45/50 315/192 |
| 2012/0293009 | A1 * | 11/2012 | Kim | H02H 7/1252 307/104 |
| 2016/0197468 | A1 * | 7/2016 | Bandel | H02H 9/06 361/118 |

FOREIGN PATENT DOCUMENTS

| | | |
|---|---|---|
| JP | 09191562 A | 7/1997 |
| JP | 4687826 B2 | 2/2011 |
| WO | 2015063310 A2 | 5/2015 |

OTHER PUBLICATIONS

Japanese Office Action (Notification of Reasons for Refusal) dated Sep. 4, 2018, issued in corresponding Japanese Patent Application No. 2017-228948, and partial computer generated English Translation thereof.

Written Opinion (PCT/ISA/237) dated Oct. 31, 2017, by the Japan Patent Office as the International Searching Authority for International Application No. PCT/JP2017/034125.

* cited by examiner

ELECTRONIC DEVICE

FIELD

The present invention relates to an electronic device suitable for use in an LED illumination device.

BACKGROUND

Patent Literature 1 discloses a surge protection circuit for protecting a device from an extraneous surge such as a lightning surge. There are also regulations against and standards for noises to reduce effects of noises generated by electronics on other devices or effects of noises generated by other devices on electronics. Typically, normal mode choke coils, common mode choke coils, Class-X capacitors, Class-Y capacitors and the like are used for noise suppression. Patent Literature 2 discloses an interference suppression circuit for protecting an LED from a noise voltage.

CITATION LIST

Patent Literature

[PTL 1] JP S63-149152U
[PTL 2] JP4687826B

SUMMARY

Technical Problem

Providing a surge protection circuit and an interference suppression circuit can improve the performance of a product. The surge protection circuit and the interference suppression circuit are typically provided separately. Both the surge protection and interference suppression circuits include a number of components, and thus providing a surge protection circuit and an interference suppression circuit separately may be an obstruction to the reduction in size and the number of components of the product.

The present invention has been made to solve the above problem, and an object thereof is to provide an electronic device provided with a circuit capable of protection from an extraneous surge and noise suppression.

Solution to Problem

An electronic device according to the present invention includes a power supply unit and a load, the power supply unit including an input section receiving electric power from an alternating current power supply, a ground terminal, a rectifier circuit connected to the input section, a circuit section connected to a DC output of the rectifier circuit, the circuit section supplying electric power to the load, a first varistor connected at one end thereof to one input end of the rectifier circuit between the input section and the rectifier circuit, a second varistor connected at one end thereof to another input end of the rectifier circuit and connected at another end thereof to another end of the first varistor between the input section and the rectifier circuit and an arrester connected at one end thereof to the another end of the second varistor and connected at another end thereof to the ground terminal, wherein an electrostatic capacity of each of the first and second varistors is 40% or more of a sum of earth capacitances of the power supply unit and the load.

Advantageous Effects of Invention

In the electronic device according to the present invention, the electrostatic capacity of each of the first varistor and the second varistor is 40% or more of the earth capacitance of the electronic device. In this case, a circuit including the first varistor, the second varistor, and the arrester has an effect of noise suppression as well as protection from an extraneous surge.

DESCRIPTION OF EMBODIMENTS

Figure 1:
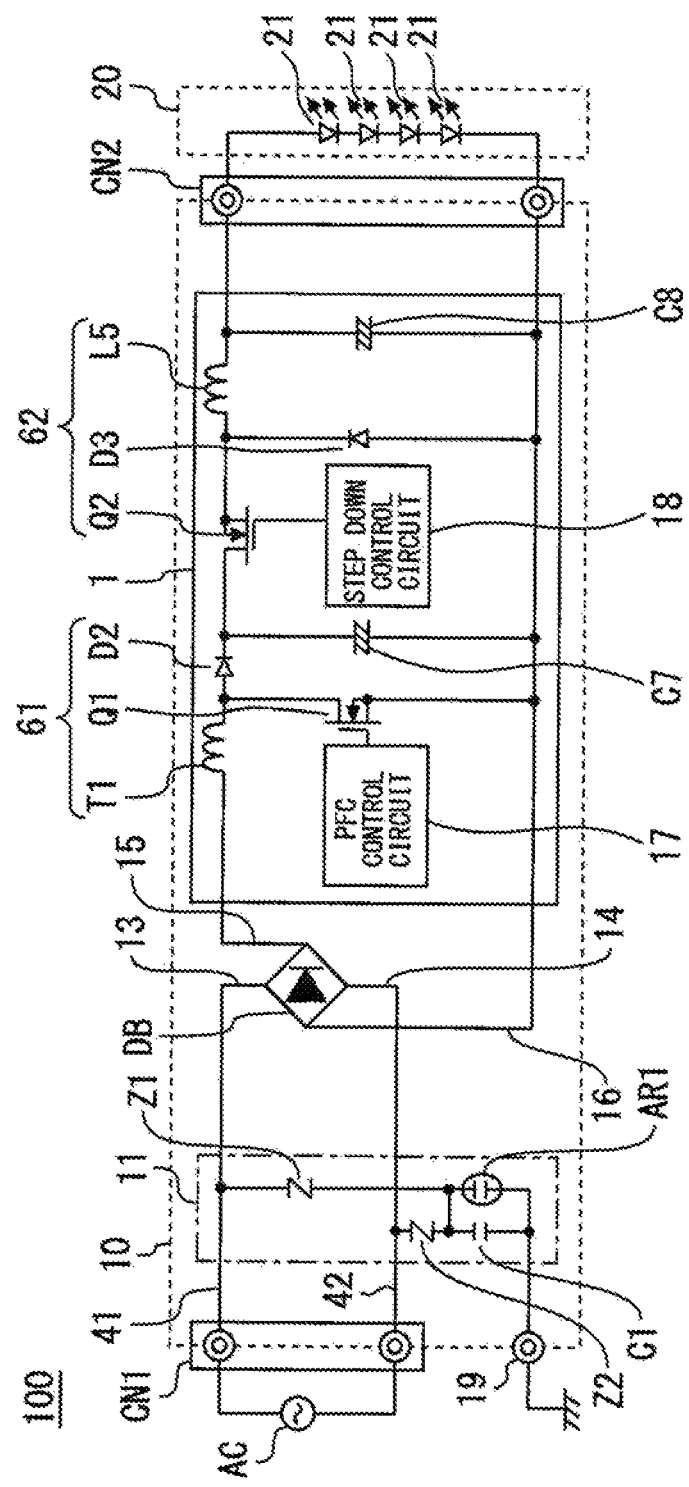
FIG. 1 is a circuit block diagram of an illumination device according to Embodiment 1

An illumination device according to an embodiment of the present invention are described with reference to drawings. Identical or corresponding constitutional elements are given the same reference numerals, and the repeated description of such constitutional elements may be omitted.

Embodiment 1

FIG. 1 is a circuit block diagram of an illumination device according to Embodiment 1. An illumination device 100 according to the embodiment includes a power supply unit 10 and a light source section 20. The light source section 20 includes a plurality of serially-connected light sources 21. The light source 21 is an LED. The power supply unit 10 includes an input section CN1. The input section CN1 includes a pair of input terminals. The pair of input terminals receives electric power from an alternating current power supply AC, which is an external power supply. The power supply unit 10 also includes a ground terminal 19. The ground terminal 19 is connected to a ground.

A rectifier circuit DB is connected to the input terminals of the input section CN1 via a protection circuit 11. The rectifier circuit DB rectifies an AC power supply voltage input from the alternating current power supply AC. A circuit section 1 is connected to DC outputs 15, 16 of the rectifier circuit DB. The power supply unit 10 includes an output section CN2. The output section CN2 includes a pair of output terminals. Outputs of the circuit section 1 are connected to the pair of output terminals. The light source section 20 is connected to the pair of output terminals. As a result, an output voltage of the circuit section 1 is supplied to the light source section 20.

The illumination device 100 includes the protection circuit 11 in a first zone, which begins at the input section CN1 and ends at input ends 13, 14 of the rectifier circuit DB. The protection circuit 11 includes a first varistor Z1 and a second varistor Z2 connected in series. An end of the first varistor Z1 is connected to one of the input ends 13 of the rectifier circuit DB between the input section CN1 and the rectifier circuit DB. An end of the second varistor Z2 is connected to the other one of the input ends 14 of the rectifier circuit DB between the input section CN1 and the rectifier circuit DB. The other end of the second varistor Z2 is connected to the other end of the first varistor Z1. The serially-connected first and second varistors Z1 and Z2 are connected between lines 41 and 42 through which the AC power supply voltage is supplied.

The protection circuit 11 further includes an arrester AR1. The arrester AR1 is connected to, at one end thereof, the other end of the second varistor. In other words, one end of the arrester AR1 is connected to a connection point of the first and second varistors Z1 and Z2. The other end of the arrester AR1 is connected to the ground terminal 19. The protection circuit 11 also includes a first capacitor C1 connected in parallel to the arrester AR1.

The illumination device 100 is provided with an enclosure. The power supply unit 10 and the light source section 20 are attached to the enclosure. The enclosure is grounded for safety reasons.

The circuit section 1 will now be described. In the embodiment, the circuit section 1 is a lighting circuit section for turning on the light source section 20. The circuit section 1 includes a PFC (Power Factor Correction) converter section and a step-down converter section. An undulating voltage is output from the DC outputs 15, 16 of the rectifier circuit DB. The PFC converter section boosts the undulating voltage into a high voltage to charge a capacitor C7. The step-down converter section steps down a voltage applied to the capacitor C7 into a voltage to be supplied to the light source section 20.

The PFC converter section is a step-up chopper circuit. The PFC converter section includes a coil T1. One end of the coil T1 is connected to the DC output 15 of the rectifier circuit DB, and the other end of the coil T1 is connected to an anode of a diode D2 and a drain of a switch device Q1. In the embodiment, the switch device Q1 is a MOSFET (Metal-Oxide-Semiconductor Field-Effect Transistor). A cathode of the diode D2 is connected to a positive pole of the capacitor C7. A source of the switch device Q1 is connected to the DC output 16 of the rectifier circuit DB. A negative pole of the capacitor C7 is connected to the source of the switch device Q1.

A PFC control circuit 17 is connected to a gate of the switch device Q1. The switch device Q1, the coil T1, and the diode D2 constitute a switching circuit 61. The PFC control circuit 17 turns on and off the switch device Q1 to bring a voltage applied to the capacitor C7 to an intended voltage.

The step-down converter section includes a switch device Q2. In the embodiment, the switch device Q2 is a MOSFET. A drain of the switch device Q2 is connected to the positive pole of the capacitor C7. A source of the switch device Q2 is connected to a cathode of a diode D3 and one end of a coil L5. An anode of the diode D3 is connected the negative pole of the capacitor C7. The other end of the coil L5 is connected to a positive pole of a capacitor C8. A negative pole of the capacitor C8 is connected to the anode of the diode D3.

A step-down control circuit 18 is connected to a gate of the switch device Q2. The switch device Q2, the coil L5, and the diode D3 constitute a switching circuit 62. The step-down control circuit 18 turns on and off the switch device Q2 to bring a voltage applied to the capacitor C8 to an intended voltage. The step-down converter section supplies electric power to the light source section 20. Here, the capacitor C8 is connected in parallel to the light source section 20. Accordingly, the light source section 20 can be supplied with a smoothed voltage even when the step-down converter section is switched.

Figure 2:
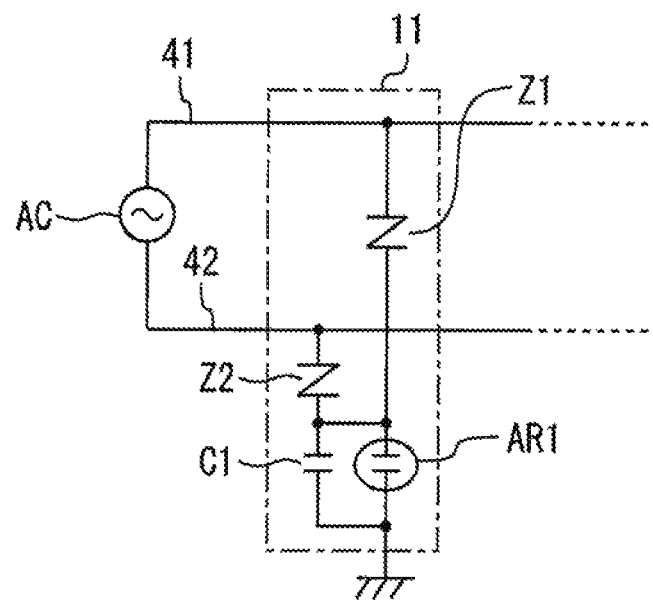
FIG. 2 is a circuit block diagram of a protection circuit according to Embodiment 1.

FIG. 2 is a circuit block diagram of a protection circuit according to Embodiment 1. The operation of the protection circuit 11 will now be described with reference to FIG. 2. For clarity, the input section CN1 and the ground terminal 19 are omitted in FIG. 2. First, description will be made to protecting operation against an extraneous surge.

Consider that a surge voltage is applied between the lines 41 and 42 through which the AC power supply voltage is input from the alternating current power supply AC. At this time, the surge voltage is applied across the series circuit of the first and second varistors Z1 and Z2. Here, resistance values of the varistors have non-linear characteristics against voltage. When a voltage above a threshold is applied to a varistor, the varistor exhibits a low impedance.

Accordingly, when a surge voltage is applied to the series circuit of the first and second varistors Z1 and Z2, both the first varistor Z1 and the second varistor Z2 exhibit a low impedance. At this time, a surge current flows through the series circuit of the first and second varistors Z1 and Z2 and returns to the side of the alternating current power supply AC. Consequently, a rise in voltage applied to the circuit on the opposite side of the protection circuit 11 from the alternating current power supply AC can be suppressed. In this way, the rectifier circuit DB, the circuit section 1, and the light source section 20 can be protected from a surge voltage.

Next, description will be made to a case in which a surge voltage is applied between the line 41, through which the AC power supply voltage is input, and the ground. At this time, the surge voltage is applied across the series circuit of the first varistor Z1 and the arrester AR1. When a voltage above a threshold is applied to the arrester AR1, a discharge tube provided to the arrester AR1 is caused to discharge. As a result, an electrical current flows through the arrester AR1.

Accordingly, when a surge voltage is applied to the series circuit of the first varistor Z1 and the arrester AR1, an electrical current is allowed to flow easily through the first varistor Z1 and the arrester AR1. At this time, a surge current flows to the ground through the series circuit of the first varistor Z1 and the arrester AR1. Consequently, a rise in voltage applied to the circuit on the opposite side of the protection circuit 11 from the alternating current power supply AC can be suppressed.

When a surge voltage is generated between the line 42, through which the AC power supply voltage is input, and the ground, a rise in voltage can similarly be suppressed by the series circuit of the second varistor Z2 and the arrester AR1. As described above, when a surge voltage is applied between either one of two poles for the AC power supply voltage and the ground, a similar effect of surge voltage suppression can be attained.

Next, the effect of noise suppression will be described. Generally, Class-X capacitors or Class-Y capacitors are used for noise suppression. Here, varistors have electrostatic capacities. Accordingly, it is considered that the effect of noise suppression can be obtained by defining a high electrostatic capacity for a varistor.

Major causes of noises are non-DC components such as rectangular waves or swings caused by circuit components provided in the illumination device 100. In the illumination device 100, the switch device Q1, the switch device Q2, the diode D2, the diode D3, and the light source 21 generate non-DC components. Accordingly, the switch device Q1, the switch device Q2, the diode D2, the diode D3, and the light source 21 may be major causes of noises.

Each of the switch device Q1, the switch device Q2, the diode D2, the diode D3, and the light source 21 has an earth capacitance. The earth capacitance is a stray capacitance between the element and the ground. Noises propagate via the earth capacitance. Accordingly, it is considered that the effect of noise suppression may be affected by the levels of electrostatic capacities of the first varistor Z1 and the second varistor Z2 relative to the earth capacitances of the switch device Q1, the switch device Q2, the diode D2, the diode D3, and the light source 21.

To calculate an electrostatic capacity of a varistor with which the effect of noise suppression can be obtained, the earth capacitance of the illumination device 100 was first measured. As described above, those elements that are major causes of noises may be taken into consideration for the earth capacitance of the illumination device 100. The earth capacitance of each element is measured between a line for supplying voltage to the element and the ground. Measured earth capacitances were: 52 pF for the switch device Q1, 43 pF for the switch device Q2, 42 pF for the diode D2, and 25 pF for the diode D3. Total of these values are 162 pF. The actual earth capacitance measured on the light source section 20 was 311 pF. As a result, it was found that the earth capacitance of the illumination device 100 was 473 pF.

Figure 3:
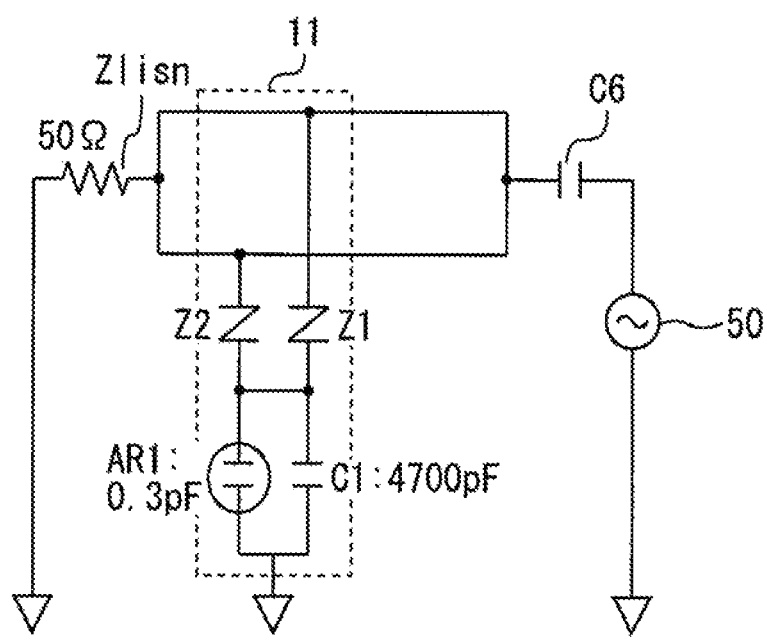
FIG. 3 is a diagram illustrating a model used for simulating an attenuation of noise.

FIG. 3 is a diagram illustrating a model used for simulating an attenuation of noise. The model shown in FIG. 3 was used to analyze a noise attenuation. In the model, a noise source 50 is connected to the protection circuit 11 at one end through a capacitor C6. A load Zlisn is connected to the other end of the protection circuit 11. The load Zlisn corresponds to the light source section 20. The load Zlisn was set to 50Ω.

The electrostatic capacity of the AR1 was set to 0.3 pF. The electrostatic capacity of the first capacitor C1 was set to 4700 pF. The capacitor C6 corresponds to the earth capacitance of the illumination device 100. The capacitance of the capacitor C6 was set to 473 pF, which is the measured value. The electrostatic capacities of the first and second varistors Z1 and Z2 are set to a same value.

Figure 4:
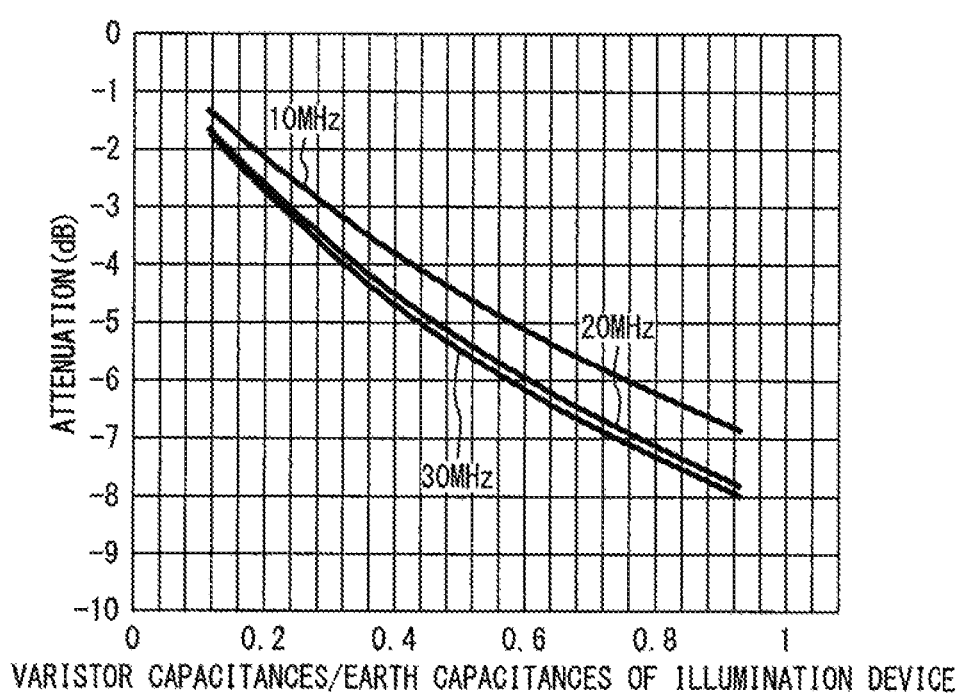
FIG. 4 is a result of the noise attenuation simulation with the protection circuit according to Embodiment 1.

FIG. 4 is a result of the noise attenuation simulation with the protection circuit according to Embodiment 1. During simulation, noise attenuation characteristics with respect to capacitance ratios were calculated. The capacitance ratios are ratios of electrostatic capacities of the first varistor Z1 and the second varistor Z2 with respect to the earth capacitance of the illumination device 100. In the simulation, the model shown in FIG. 3 was used. Here, the amounts shown on the axis of abscissas in FIG. 4 are varistor capacitances divided by earth capacitances of the illumination device 100. The varistor capacitances shown on the axis of abscissas in FIG. 4 also show an electrostatic capacity of each of the first and second varistors Z1 and Z2.

According to the result of the simulation, with frequencies of 20 MHz and 30 MHz and when the capacitance ratios are 0.36 or more, the attenuation is −4 dB or more. With a frequency of 10 MHz, the attenuation is −4 dB or more when the capacitance ratios are 0.44 or more.

Generally, noise measurements may have an uncertainty of 3 dB to 4 dB. Therefore, when the attenuation is −3 dB or more, the attenuation may be made larger than the uncertainty. Accordingly, when selection may be made from varistor capacitances that provide an attenuation of −3 dB or more, the effect of noise suppression can be obtained in the noise measurements even with measurement errors taken into consideration. In the embodiment, considering the above discussion, the electrostatic capacity of each of the first and second varistors Z1 and Z2 is set to 40% or more of the earth capacitance of the illumination device 100.

In the embodiment, the electrostatic capacity of each of the first and second varistors Z1 and Z2 is 40% or more of the earth capacitance of the illumination device 100. Here, the earth capacitance of the illumination device 100 is a sum of earth capacitances of the power supply unit 10 and the light source section 20. Further, considering the fact that the earth capacitance of the illumination device 100 is 473 pF, the electrostatic capacity of each of the first and second varistors Z1 and Z2 is 200 pF or more. In this case, the effect of noise suppression can be obtained with the protection circuit 11. Accordingly, the reliability of a product can be improved. In this way, there can be provided an illumination device 100 that the user can feel safe to use.

The series circuit of the arrester AR1 and the first varistor Z1 and the series circuit of the arrester AR1 and the second varistor Z2 form a Class-Y capacitor for suppressing common mode noises. Here, the electrostatic capacity of the arrester AR1 is smaller than the electrostatic capacities of the varistors. Consequently, the effect of these series circuits as a Class-Y capacitor is reduced. To deal with this, in the embodiment, the first capacitor C1 is provided in parallel to the arrester AR1. As a result, the effect of the protection circuit 11 as a Class-Y capacitor can be improved. The electrostatic capacity of the first capacitor C1 may preferably be equal to or larger than the electrostatic capacity of each of the first and second varistors Z1 and Z2. It should be noted that the first capacitor C1 may be omitted.

Figure 5:
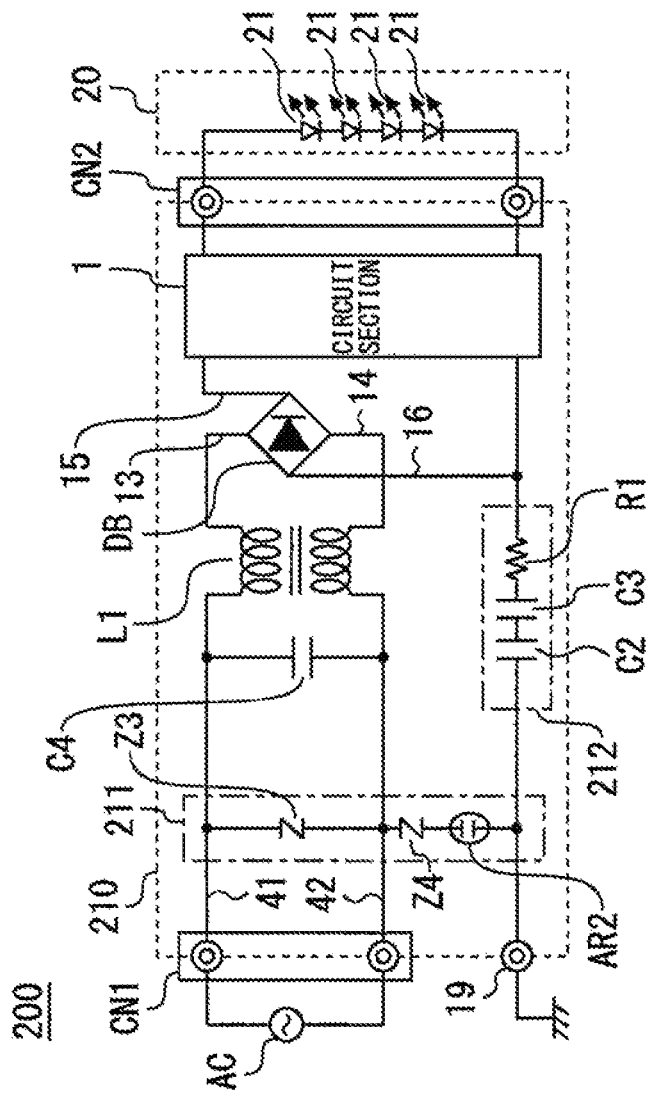
FIG. 5 is a circuit block diagram of an illumination device according to a comparative example.

FIG. 5 is a circuit block diagram of an illumination device according to a comparative example. An illumination device 200 according to the comparative example includes a power supply unit 210 and a light source section 20. The power supply unit 210 has a first zone of different structure from that of the illumination device 100. The first zone begins at an input section CN1 and ends at input ends 13, 14 of a rectifier circuit DB. The rest is similar to the illumination device 100. In FIG. 5, the internal structure of the circuit section 1 is omitted.

The illumination device 200 includes a protection circuit 211. In the protection circuit 211, lines 41 and 42 through which an AC power supply voltage is supplied are connected via a varistor Z3. One end of a varistor Z4 is connected to the line 42. The other end of the varistor Z4 is connected to one end of an arrester AR2. The other end of the arrester AR2 is connected to the ground. A capacitor C4 is connected between the lines 41 and 42 between the protection circuit 211 and the rectifier circuit DB. A coil L1 is connected between the capacitor C4 and the rectifier circuit DB.

The illumination device 200 includes an interference suppression circuit 212. The interference suppression circuit 212 is connected between a DC output 16 serving as a circuit ground of the rectifier circuit DB and the ground. The interference suppression circuit 212 includes a series circuit of a capacitor C2, a capacitor C3 and a resistor R1, which are connected in this order.

Consider that a surge voltage is applied between the lines 41 and 42 through which the AC power supply voltage is input. At this time, the surge voltage is applied across the varistor Z3. As a result, a rise in voltage applied to the circuit on the opposite side of the protection circuit 211 from the alternating current power supply AC is suppressed. Consequently, subsequent circuits of the protection circuit 211 are protected.

Next, consider that a surge voltage is applied between the line 41, through which the AC power supply voltage is input, and the ground. At this time, the surge voltage is applied to the series circuit of the varistor Z3, the varistor Z4 and the arrester AR2. Consequently, the subsequent circuits of the protection circuit 211 are protected. When a surge voltage is generated between the line 42, through which the AC power supply voltage is input, and the ground, the subsequent circuits of the protection circuit 211 are protected by the series circuit of the varistor Z4 and the arrester AR2.

The capacitor C4 serves as a Class-X capacitor. The coil L1 serves as a common mode choke coil. The capacitor C2 and the capacitor C3 both provided in the interference suppression circuit 212 serve as a Class-Y capacitor. Generally, common mode noises can be suppressed by connecting a capacitor between a constant potential such as a circuit ground of a rectifier circuit or a DC voltage line and the ground. Therefore, common mode noises can be suppressed by the interference suppression circuit 212.

The illumination device 200 according to the comparative example includes the interference suppression circuit 212, the capacitor C4 and the coil L1 for noise suppression. In contrast, in the embodiment, protection from an extraneous surge and noise suppression can be achieved by the protection circuit 11. Accordingly, the interference suppression circuit 212, the capacitor C4 and the coil L1 for noise suppression can be omitted. As a result, the size of the illumination device 100 can be reduced. In addition, the illumination device 100 can be produced with a reduced number of components. Accordingly, the manufacturing costs can be reduced.

Generally, a surge protection circuit and a noise filter for noise suppression are separated. In contrast, in the embodiment, there can be provided a protection circuit 11 that provides for both protection from an extraneous surge and noise suppression. Accordingly, the illumination device 100 can dispense with a noise filter such as the interference suppression circuit 212. Noise filters provided in the illumination device can also be reduced.

Generally, varistors are used for protection from an extraneous surge, and not for noise suppression. Further, since varistors are not generally expected for noise suppression, definite ranges of electrostatic capacity are not defined. In the embodiment, a minimum value of electrostatic capacity for a varistor is defined for noise suppression by the varistor. In this way, varistors can be used to obtain the effect of noise suppression.

In the embodiment, the circuit section 1 includes the switching circuits 61 and 62. The switching circuits 61 and 62 include switch devices Q1 and Q2, and diodes D2 and D3. Generally, non-DC components generated by those elements are major causes of noises in the circuit section. Consequently, an electronic device provided with a switching circuit is problematically affected by, in particular, noises. In the embodiment, the capacitance of a varistor is determined with respect to the earth capacitances of the switch devices Q1 and Q2, the diodes D2 and D3, and the light source section 20. In this way, a suitable effect of noise suppression can be provided for an electronic device provided with a switching circuit.

As a variation of the embodiment, the illumination device 100 may be provided with a noise filter for noise suppression in addition to the protection circuit 11. In this way, the effect of noise suppression can be increased over the illumination device 100 according to the embodiment.

Figure 6:
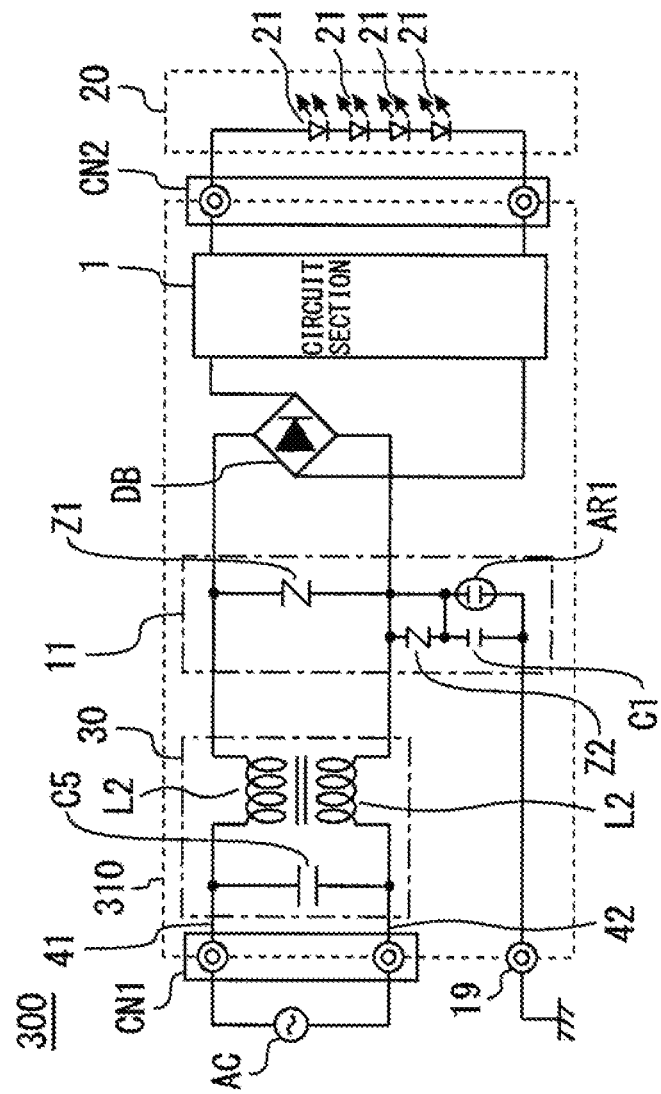
FIG. 6 is a circuit block diagram of an illumination device according to a first variation of Embodiment 1.

FIG. 6 is a circuit block diagram of an illumination device according to a first variation of Embodiment 1. An illumination device 300 according to the first variation includes a power supply unit 310. The power supply unit 310 includes a noise filter circuit 30 connected between a protection circuit 11 and an input section CN1. The rest of the structure is similar to the power supply unit 10. In FIG. 6, the internal structure of the circuit section 1 is omitted.

The noise filter circuit 30 includes a capacitor C5. The capacitor C5 is connected at one end to a line 41, through which the AC power supply voltage is supplied from an alternating current power supply AC. The other end of the capacitor C5 is connected to a line 42. A coil L2 is connected between the capacitor C5 and the protection circuit 11. The capacitor C5 and the coil L2 serve as a noise filter. The noise filter is also referred to as a line filter.

The capacitor C5 serves as a Class-X capacitor. The capacitor C5 suppresses normal mode noises appearing between lines 41 and 42 through which the AC power supply voltage is supplied. The coil L2 serves as a common mode choke coil. The coil L2 suppresses common mode noises appearing between the line 41 or 42 and the ground.

In the first variation, the noise filter circuit 30 is connected between the input section CN1 and the protection circuit 11. Accordingly, the effect of noise suppression is increased over the illumination device 100 by inductance and electrostatic capacity components of the noise filter circuit 30. Further, the noise filter circuit 30 is located on the side of the alternating current power supply AC from the protection circuit 11. In this configuration, the effect of noise suppression is larger than the case in which the noise filter circuit 30 is provided on a stage behind the protection circuit 11. Here, being located on the side of the alternating current power supply AC from the protection circuit 11, the noise filter circuit 30 may be subjected to a surge voltage. Therefore, it is preferable to use high withstand voltage components for the capacitor C5 and the coil L2.

Figure 7:
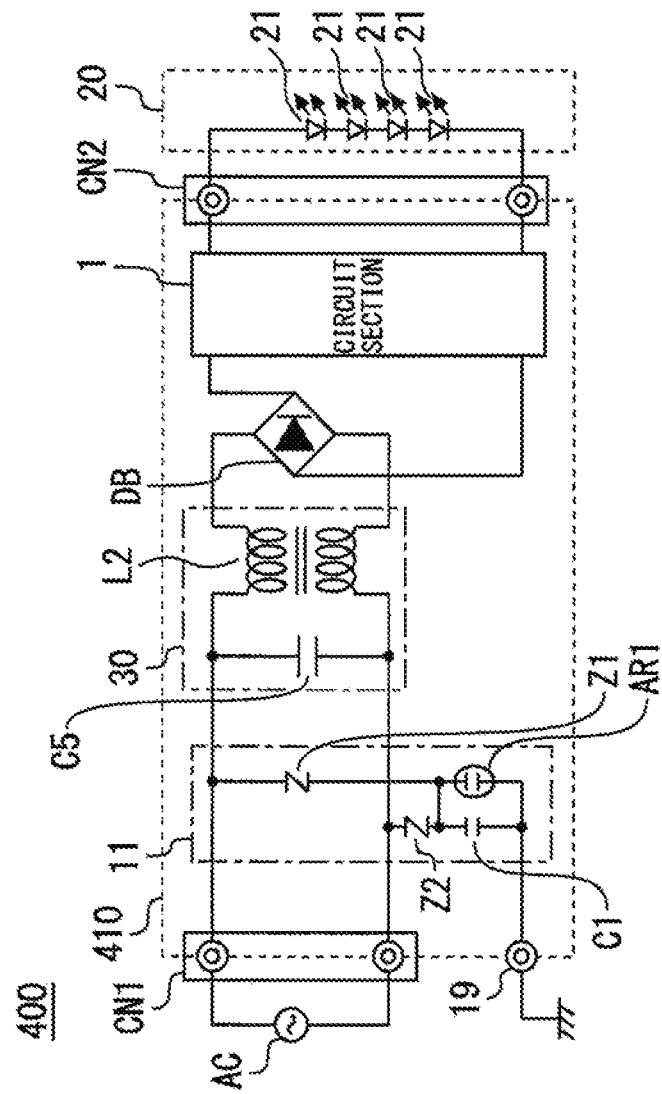
FIG. 7 is a circuit block diagram of an illumination device according to a second variation of Embodiment 1.

FIG. 7 is a circuit block diagram of an illumination device according to a second variation of Embodiment 1. An illumination device 400 according to the second variation includes a power supply unit 410. In the power supply unit 410, a noise filter circuit 30 is connected between a protection circuit 11 and a rectifier circuit DB. The rest of the structure is similar to the power supply unit 310. The structure of the noise filter circuit 30 is also similar to the first variation. In FIG. 7, the internal structure of the circuit section 1 is omitted.

In the second variation, the noise filter circuit 30 is connected between the rectifier circuit DB and the protection circuit 11. Accordingly, the noise filter circuit 30 is protected from a surge voltage by the protection circuit 11. Accordingly, the illumination device 400 is more resistant to an extraneous surge than the illumination device 300. In addition, the effect of noise suppression is increased over the illumination device 100 by inductance and electrostatic capacity components of the noise filter circuit 30.

In the illumination device 400, the noise filter circuit 30 is provided on a stage behind the protection circuit 11. In this case, the effect of noise suppression is larger in the illumination device 300 than in the illumination device 400. Accordingly, it is preferable that the illumination device 400 has a larger electrostatic capacity of the first capacitor C1, the capacitor C5, the first varistor Z1 or the second varistor Z2 for increasing the effect of noise suppression. Alternatively, another capacitor may be provided in parallel to the first capacitor C1 or the capacitor C5 for increasing the electrostatic capacity.

In the embodiment, description has been made to the illumination device 100 provided with the light source 21 that is an LED. Here, a device provided with the protection circuit 11 is not limited to the illumination device, but may be any other electronic device. Such an electronic device should include a load and a power supply unit 10 for supplying electric power to the load. In the embodiment, such a load is the light source 21. Further, the switching circuits 61 and 62 included in the circuit section 1 may have any other configuration as long as they are circuits that generate electric power to be supplied to the load by turning on and off a switch device.

In the embodiment, the electrostatic capacities of the first and second varistors Z1 and Z2 are set to a same value. Alternatively, the electrostatic capacities of the first and second varistors Z1 and Z2 may not be the same.

REFERENCE SIGNS LIST 100,300,400 illumination device, 10,310,410 power supply unit, 21 light source, AC alternating current power supply, CN1 input section, 19 ground terminal, DB rectifier circuit, 15,16 DC outputs, 1 circuit section, 13,14 input end, Z1 first varistor, Z2 second varistor, AR1 arrester, 30 noise filter circuit, C1 first capacitor, 61,62 switching circuit, Q1,Q2 switch device, D2,D3 diode

The invention claimed is:

1. An electronic device, comprising:
a power supply unit; and
a load,
the power supply unit including:
an input section receiving electric power from an alternating current power supply;
a ground terminal;
a rectifier circuit connected to the input section;
a circuit section connected to a DC output of the rectifier circuit, the circuit section supplying electric power to the load;
a first varistor connected at one end thereof to one input end of the rectifier circuit between the input section and the rectifier circuit;
a second varistor connected at one end thereof to another input end of the rectifier circuit and connected at another end thereof to another end of the first varistor between the input section and the rectifier circuit; and
a suppression element connected at one end thereof to the another end of the second varistor and connected at another end thereof to the ground terminal,
wherein an electrostatic capacity of each of the first and second varistors is 40% or more of a sum of earth capacitances of the power supply unit and the load.

2. The electronic device according to claim 1, wherein the electrostatic capacity of each of the first and second varistors is 200 pF or more.

3. The electronic device according to claim 1, wherein the circuit section comprises a switch device and a diode, and
the sum of earth capacitances is a sum of earth capacitances of the switch device, the diode, and the load.

4. The electronic device according to claim 1, further comprising a noise filter circuit connected between the first and second varistors and the input section.

5. The electronic device according to claim 4, wherein the noise filter circuit comprises a coil.

6. The electronic device according to claim 1, further comprising a noise filter circuit connected between the first and second varistors and the rectifier circuit.

7. The electronic device according to claim 1, wherein the suppression element includes a capacitive element.

8. The electronic device according to claim 7, wherein the capacitive element is a first capacitor.

9. The electronic device according to claim 7, wherein an electrostatic capacity of the capacitive element is equal to or larger than the electrostatic capacity of each of the first and second varistors.

10. The electronic device according to claim 7, further comprising an arrester connected in parallel to the capacitive element.

11. The electronic device according to claim 1, wherein the load is a light source, and
the electronic device is an illumination device.

12. The electronic device according to claim 1, wherein the suppression element comprises an arrester.

13. The electronic device according to claim 12, wherein the suppression element comprises a capacitor.

14. The electronic device according to claim 1, wherein the suppression element is configured to suppress noise associated with non-DC circuit components.

15. The electronic device according to claim 1, wherein the suppression element is configured to suppress voltage associated with surge.

16. The electronic device according to claim 1, wherein the suppression element is configured to suppress (1) noise associated with non-DC circuit components and (2) voltage associated with surge.

* * * * *